United States Patent [19]
Ito

[11] 3,800,356
[45] Apr. 2, 1974

[54] WINDSHIELD WIPER FOR AUTOMOBILE OR THE LIKE

[76] Inventor: Isao Ito, 119 Kamizakitakanicho-8-chome, Handa, Japan

[22] Filed: Feb. 8, 1972

[21] Appl. No.: 224,514

[30] Foreign Application Priority Data
Feb. 19, 1971 Japan.................................. 46-8252

[52] U.S. Cl. .......................................... 15/250.34
[51] Int. Cl. ............................................. B60s 1/34
[58] Field of Search....... 15/250.34, 250.31, 250.32, 15/250.35; 287/53 WA

[56] References Cited
UNITED STATES PATENTS
| | | | |
|---|---|---|---|
| 2,860,365 | 11/1958 | Krohm......................... | 15/250.34 X |
| 2,962,309 | 11/1960 | Wise............................. | 287/53 WA |
| 2,979,352 | 4/1961 | Anderson...................... | 287/53 WA |
| 2,980,453 | 4/1961 | Nesson......................... | 15/250.34 X |

FOREIGN PATENTS OR APPLICATIONS
912,820  12/1962   Great Britain.................. 15/250.35

*Primary Examiner*—Peter Feldman
*Attorney, Agent, or Firm*—Cushman, Darby & Cushman

[57] ABSTRACT

In a wiper arm of a windshield wiper comprising an arm head and a retainer, a cover of stainless steel is provided which is rotatably fixed to the arm head coaxially of the retainer to cover the arm head and its joint to a driving shaft of a wiper motor. Coating of the arm head and its nut for fastening it to the driving arm, which are exposed in the prior art, can be eliminated so that cost can be reduced, and handling of these parts in assembly can be facilitated since no care against the damage to the coated surfaces thereof is required. The overall appearance of the windshield wiper can be much enhanced because the exposed parts such as cover, retainer, arm piece and the like are all made of stainless steel.

3 Claims, 12 Drawing Figures

WINDSHIELD WIPER FOR AUTOMOBILE OR THE LIKE

BACKGROUND OF THE INVENTION

The present invention relates to generally an improvement relating and in a windshield wiper for an automobile or the like, and more particularly a wiper arm thereof.

The wiper arm of the prior art windshield wiper, in general, comprises an arm head, a retainer and an arm piece at the end of which is fixed a wiper blade. The arm head is securely fixed to a driving shaft of a wiper motor or the like with a nut and a washer to oscillate the wiper blade to clear the windshield of the rain. However, the arm head and its nut and washer for fastening the arm head to the wiper driving shaft are exposed so that their surfaces in general must be finished with a higher degree of smoothness and further coated with a protective metal in order to provide better corrosion resistance and also to enhance their appearance. Therefore, their fabrication steps are increased, thus resulting in the high cost. Furthermore, the arm head, the nut, and the washer are made of different materials, for example, zinc, copper and spring steel, respectively in view of their fabrication processes and functions, from stainless steel of which are made the retainer and the arm piece. It, therefore, extremely difficult to coat the surfaces of the arm head and nut to provide stainless-steel-like appearance completely similar to that of the retainer and arm piece. As a result the appearance of the windshield wiper assembled from these parts does not look uniformly. Furthermore, the coated parts such as arm heads and nuts must be handled in assembly with a great care in order not to cause the damages to the surfaces thereof.

SUMMARY OF THE INVENTION

The present invention was made to overcome these problems encountered in the prior art windshield wipers.

One of the objects of the present invention is therefore to provide an improved windshield wiper for an automobile or the like which can be fabricated at less cost from inexpensive parts and whose appearance can be uniformly enhanced without using expensive coated parts.

Another object of the present invention is to provide an improved windshield wiper which can be assembled in a simpler manner as compared with the prior art windshield wipers employing coated parts.

Briefly stated, according to the present invention, a wiper arm of a windshield wiper comprises in general an arm head, a retainer, an arm piece, and a cover, all of which are made of stainless steel. The cover is rotatably fixed to the arm head coaxially of the retainer, and is adapted to cover the arm head and its joint to a driving shaft of a wiper motor. Therefore, unlike the prior art arm head, that of the present invention is not required to be coated to enhance its appearance, and a nut used for fastening the arm head to the driving shaft may be an ordinary inexpensive nut plated with zinc. Bcause of these inexpensive parts, the windshield wiper in accordance with the present invention can be fabricated at less cost. Furthermore, since the surfaces of the arm heads and nuts are not coated for enhancing their appearance, they can be handled freely in a assembly without care against the damages to the coated surfaces thereof. Thus, the assembly of the windshield wipers can be much facilitated.

The above and other objects, features and advantages of the present invention will become more apparent from the following description of the preferred embodiment thereof taken in conjunction with the accompanying drawing and by comparison with the prior art windshield wiper.

DESCRIPTION OF THE PREFERRED EMBODIMENT

Figure 1:
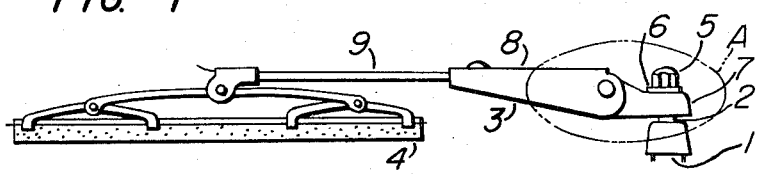
FIG. 1 is a schematic view of a prior art windshield wiper.
Figure 2:
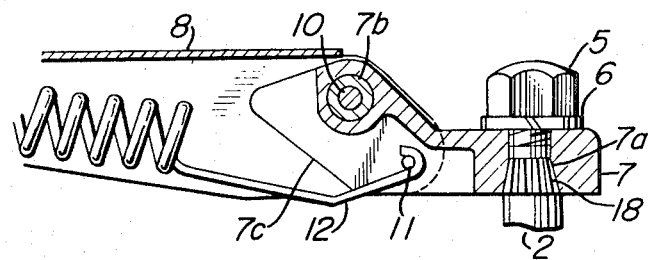
FIG. 2 is a fragmentary sectional view, on enlarged scale, of a portion encircled by the two-dot chain line in FIG. 1.

Prior to the description of the preferred embodiment of the present invention, the prior art windshield wiper will be described briefly in order to more specifically point out the problems thereof, which the present invention tends to overcome. As shown in FIGS. 1 and 2, a prior art wiper arm generally designated by 3 comprises, in general, an arm head 7, a retainer 8, and an arm piece 9, and is rotatably fixed with a nut 5 and a washer 6 to a driving shaft 2 of a wiper motor which in turn is rotatably extended through a cylindrical holder 1 securely fixed to a body of an automobile or the like. A wiper blade assembly generally designated by 4 is fixed to the arm pirce 9, and is oscillated by the driving shaft 2 to wipe the windshield. More particularly, as shown in FIG. 2, prior art wiper arm, the arm head 7 has its tapered hole 7a fitted over a tapered and knurled portion 18 of the driving shaft 2, and is forcibly pressed against it with the nut 5 and the washer 6 to provide a secure joint between the arm head 7 and the driving shaft 2. The retainer 8 is rotatably fixed to the arm head 7 with a bush 7b and a hinge pin 10, and one end of a coiled spring 12, which serves to press the wiper blade against the windshield, is fixed to a pin 11 which in turn is fixed to the arm head 7, whereas the other end is fixed to the retainer 8.

From the foregoing description, it is seen that the nut, 5, the washer 6 and the arm head 7 of the prior art windshield wiper are completely exposed so that their surfaces must be finished with a higher degree of smoothness, and coated with a protective metal to provide better corrosion resistance and to enhance their appearance. For this purpose the nut 5 is made of for example expensive brass or the like, and its head is rounded in order to enhance its appearance. It is coated with chrominum to further enhance its appearance. Therefore, even the bolt fabrication steps are increased, thus resulting in the increase in cost. The washer is generally made of an expensive spring steel because high elasticity is desired, and the arm head 7 is in general fabricated by molding because its contour is rather complex. Therefore the arm head is generally made of a metal having a low melting point such as a zinc since stainless steel which would enhance appearance cannot be used in molding the arm head as it has a high melting point. The molded arm head 7 is generally plated with chrominum to enhance its appearance. Whereas the nut 5 and the arm head 7 are made of copper and zinc, respectively, the retainer 8 and the arm piece 9 are in general made of stainless steel so that due considerations are given in coating or electroplating to provide the arm head 7 and the nut 5 with appearance similar to that of the retainer 8 and the arm piece 9. However, it is impossible to provide appearance completely similar to that of the retainer and the arm piece. As a result, the appearance of the parts of the windshield wiper is not uniform. Furthermore, in assembly, the nuts and the arm heads whose surfaces are coated as described above, must be handled with great care in order not to cause the damages to the coated surfaces thereof.

Next referring to FIGS. 3 – 12, the preferred embodiment of the present invention will be described hereinafter. As in the case of the prior art, the free end of the driving shaft 2 is tapered and knurled at 18, and is further externally threaded at 19. The arm head 7 is securely fixed to the driving shaft 2 with the ordinary nut 5 and the spring washer 6 made of spring steel. The nut 5 is generally plated with zinc in order to provide better corrosion resistance, but not to enhance appearance. It should be further noted that unlike the round head of the nut 5 used in the conventional windshield wiper shown in FIGS. 1 and 2, the nut used in the present invention has a hexagon head. As in the case of the prior art arm head 7, it has a tapered hole 7a into which is fitted the tapered and knurled portion 18 of the driving shaft 2. The arm head is fabricated from zinc or the like by casting but, unlike the prior art arm head, its surface is not coated to enhance appearance. The retainer 8 which is made of stainless steel and constitute the wiper arm together with the arm piece 9 (See FIG. 1) and the arm head 7, is rotatably fixed to the arm head 7 with the hinge pin 10 extending through the side walls 8a of the retainer 8 and the bush 7b. The coiled spring 12 is held in position with the pin 11 which in turn is fitted into the holes 7d formed in the side walls 7c of the arm head 7. The diameter of the holes 7d is about two times that of the pin 11, and both ends of the pin 11 extend through the holes 7d and abut against the side walls 8a of the retainer 8.

Figure 3:
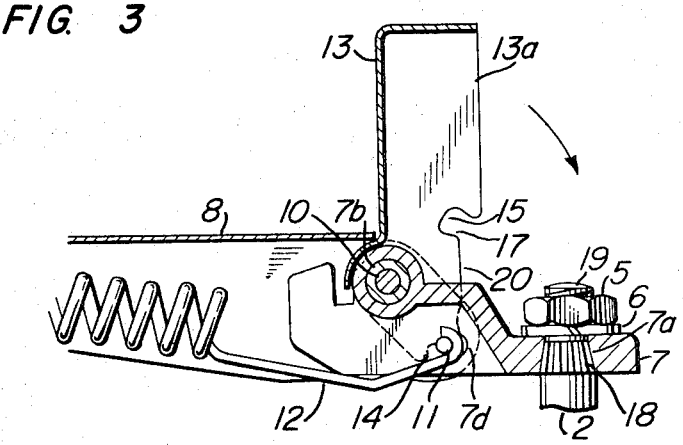
FIG. 3 is a fragmentary sectional view of a windshield wiper in accordance with the present invention corresponding to the portion of the prior art shown in FIG. 2, a cover being illustrated in opened position.
Figure 4:
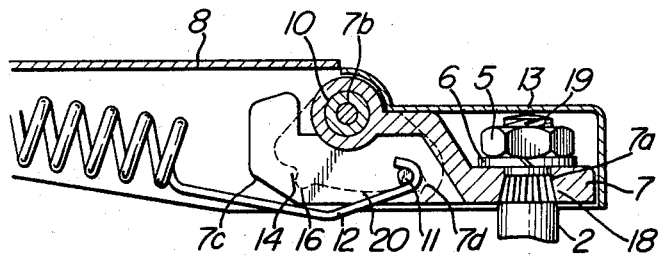
FIG. 4 is a view similar to FIG. 3, but illustrates the cover in closed position.
Figure 5:
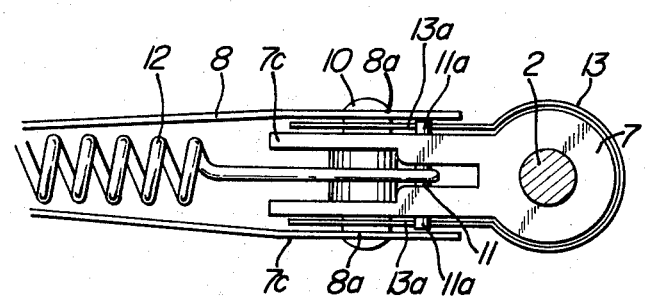
FIG. 5 is a bottom view thereof.
Figure 6:
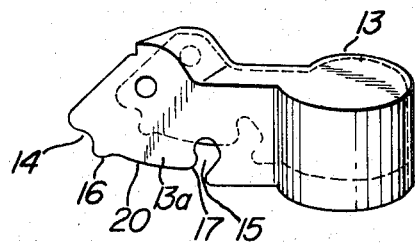
FIG. 6 is a perspective view of the cover of the present invention.

A cover 13 which is formed as best shown in FIG. 6 of stainless steel, is adapted to cover the arm head 7 and its joint to the driving shaft 2, that is the nut 5 and the washer 6, and is rotatably fixed to the hinged pin 10. Notches 14 and 15 are formed in the side walls 13a of the cover 13, and when the pin 11 engages with the notches 15 as shown in FIG. 4, the cover 13 is maintained in closed position to cover not only the arm head 7 but also its joint to the driving shaft 2, whereas when the pin engages with the notches 14, as shown in FIG. 3, the cover 13 is maintained in opened position. As best shown in FIG. 6, the cover 13 is provided with a projection 16 formed in continuation with the notch 14 and another projection 17 formed in continuation with the notch 15. A cam surface 20 is formed between the two projections 16 and 17 to facilitate the opening or closing of the cover 13 as will be described in more detail hereinafter.

Next the general mode of assembly of the wiper arm with the above construction to the driving shaft 2 will be described. Prior to the assembly, the cover 13 is raised to have the notches 14 fitted over the ends 11a of the pin 11 as shown in FIG. 3 so that the cover 13 is maintained in opened position substantially at 90° to the arm head 7. Next the tapered hole 7a of the arm head 7 is fitted over the tapered and knurled portion 18 of the driving shaft 2, and is securely fixed thereto with the nut 5 and the washer 6. Thereafter, the cover 13 is rotated in the direction indicated by the arrow shown in FIG. 3 until the notches 15 of the cover 13 engage with the ends 11a of the pin 11 to cover the nut 5, the washer 6 and the arm head 7 as shown in FIG. 4. Thus, the assembly is accomplished.

Figure 7:
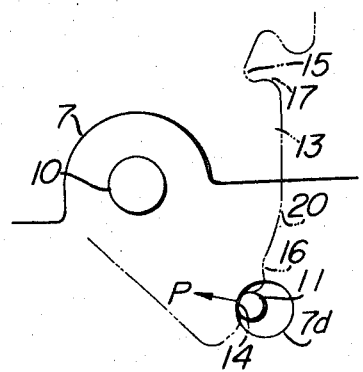
FIGS. 7 – 12 are views used to explain the mode of opening and closing operations of the cover shown in FIG. 6.
Figure 8:
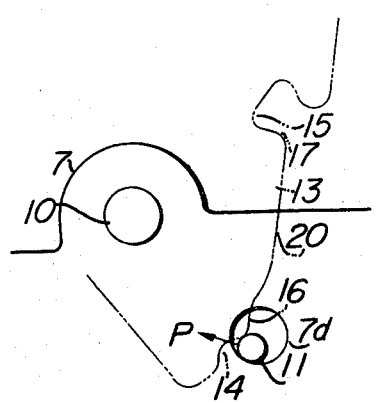
Figure 9:
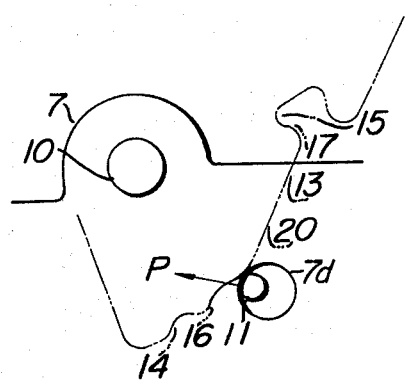
Figure 10:
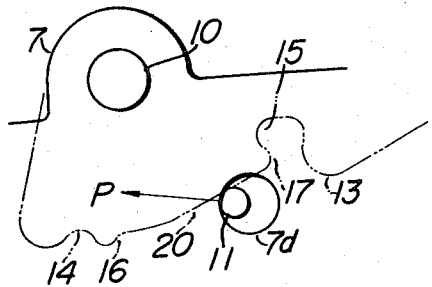
Figure 11:
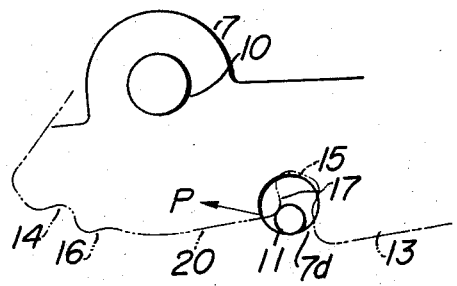
Figure 12:
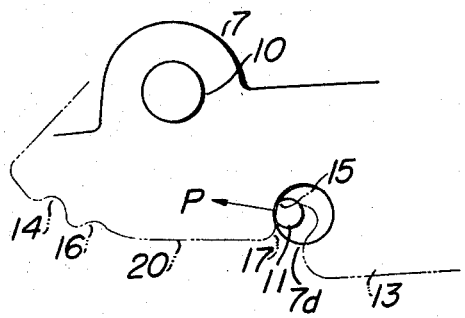

The above assembly will be described in more detail with particular reference to FIGS. 7 – 12. In FIG. 7, the cover 13 is opened as shown in FIG. 3, and the notches 14 of the cover 13 are in engagement with the ends 11a of the pin 11. Since the force P is always exerted to the pin 11 in the direction indicated by the arrow as the pin 11 retains one end of the coiled spring 12, the cover can be positively maintained in opened position so long as no external force is exerted thereto. Next the cover 13 is rotated in the direction indicated by the arrow in FIG. 3. In this case, the projection 16 continuous with the notch 14 serves to displace slantly and downwardly the pin 11 to the position shown in FIG. 8 against the force P of the spring 12. When the pin 11 overrides past the projection 16, it is returned to the initial position under the force of the spring 12. While the cover 13 is further rotated, the cam surface 20 of the cover is gradually moved away from the pin 11 between the projections 16 and 17, that is the cam surface 20 does not contact with the pin 11. As a result, the cover 13 can be easily rotated without meeting any resistance toward the projection 17. When the cover 13 rotates through a predetermined angle from the position shown in FIG. 7 to the position shown in FIG. 10, its cam surface 20 comes to contact again with the pin 11, and when the cover 13 is further rotated, its projection 17 causes the pin 11 to move slantingly downwardly to the position shown in FIG. 11, and when the pin 11 rides pass the projection 17 and engages with the notches 15 as shown in FIG. 12, the force P of the coiled spring 12 is exerted to the pin 11 in the direction indicated by the arrow shown in FIG. 12 so that it is securely held in the notches 15 so long as no external force is exerted on the cover. Thus, the cover 13 can be securely maintained in closed position as shown in FIG. 4.

From the foregoing description, it is seen that according to the present invention, the cover is rotatably fixed to the hinge pin with which the retainer is rotatably fixed to the arm head, for covering not only the arm head but also its joint to the driving shaft of the wiper motor. Therefore, fastening means such as nuts and washers for joining the arm heads to the driving shafts are not required to be coated with protective metal and not required to be made of special materials such as brass, zinc or the like. As a result inexpensive standard parts may be advantageously employed. Furthermore, the cover can be made of stainless steel as in the case of the retainer and the arm piece so that the overall appearance of the windshield wiper in accordance with the present invention can be made uniform, and much enhanced. Moreover, handling of the arm heads and nuts in assembly, and especially tightening of nuts can be facilitated because no care is required to be exercised so as not to damage the coated surfaces thereof.

What is claimed is:

1. A windshield wiper apparatus comprising an arm head, a wiper motor having a driving shaft, means for fastening said arm head to said driving shaft, a retainer pivotally connected to said arm head by a hinge pin, a wiper blade assembly connected to said retainer, and a cover for said arm head and said fastening means, said cover being mounted on said hinge pin for pivotal movement between open and closed positions, wherein said cover is formed with a notch therein and said arm head has a latching pin extending therefrom, said notch being adapted to be engaged with said latching pin when said cover is in said closed position and a spring means provided to bias said latching pin so that said cover is retained in said closed position.

2. A windshield wiper apparatus according to claim 1, wherein said cover further comprises an additional notch adapted to be engaged with said latching pin when said cover is in said open position to thereby retain said cover in said open position.

3. A windshield wiper apparatus according to claim 1, wherein said spring means is a coiled spring for urging said wiper blade assembly against the windshield.

* * * * *